(12) United States Patent
Salemi (10) Patent No.: US 9,407,551 B2
(45) Date of Patent: Aug. 2, 2016

(54) METHOD OF TRANSFERRING DATA AND CORRESPONDING DEVICE

(75) Inventor: Ennio Salemi, Grenoble (FR)

(73) Assignee: ST-Ericsson SA, Plan-les-Ouates (CH)

( * ) Notice: Subject to any disclaimer, the term of this patent is extended or adjusted under 35 U.S.C. 154(b) by 1277 days.

(21) Appl. No.: 12/361,636

(22) Filed: Jan. 29, 2009

(65) Prior Publication Data

US 2009/0192939 A1 Jul. 30, 2009

(30) Foreign Application Priority Data

Jan. 30, 2008 (FR) ..................................... 08 50579

(51) Int. Cl.
*G06Q 40/00* (2012.01)
*H04L 12/801* (2013.01)
*G06Q 20/40* (2012.01)

(52) U.S. Cl.
CPC ................ *H04L 47/10* (2013.01); *G06Q 20/40* (2013.01); *H04L 47/17* (2013.01); *H04L 47/39* (2013.01)

(58) Field of Classification Search
CPC ....... G06Q 10/00; G06Q 20/00; G06Q 30/00; G06Q 40/00
USPC ..................................... 705/3–44, 35 R–38 R
See application file for complete search history.

(56) References Cited

U.S. PATENT DOCUMENTS

| | | | | |
|---|---|---|---|---|
| 5,999,468 A | * | 12/1999 | Lawrence | 365/201 |
| 6,021,397 A | * | 2/2000 | Jones et al. | 705/36 R |
| 7,068,729 B2 | * | 6/2006 | Shokrollahi et al. | 375/296 |
| 2001/0042785 A1 | * | 11/2001 | Walker et al. | 235/379 |
| 2003/0110112 A1 | * | 6/2003 | Johnson et al. | 705/36 |
| 2004/0117302 A1 | * | 6/2004 | Weichert et al. | 705/40 |
| 2007/0072622 A1 | * | 3/2007 | Ishibashi et al. | 455/456.1 |
| 2007/0194807 A1 | * | 8/2007 | Reblewski et al. | 326/38 |

FOREIGN PATENT DOCUMENTS

| | | |
|---|---|---|
| EP | 1641197 | 3/2006 |
| WO | WO9825378 | 6/1998 |

\* cited by examiner

*Primary Examiner* — Frantzy Poinvil
(74) *Attorney, Agent, or Firm* — Coats & Bennett, PLLC (57) ABSTRACT

The method of transferring data between a first and a second set of elements via a switch that includes a set of paths each associated with a weighting coefficient representing a data stream for each path. The method includes a credit flow control between the first set of elements and the switch and a credit flow control between the switch and the second set of elements. An available credit coefficient is computed for each element of the first set on the basis of a credit allocated by each element of the second set and of the weighting coefficient of each path.

22 Claims, 7 Drawing Sheets

METHOD OF TRANSFERRING DATA AND CORRESPONDING DEVICE

FIELD OF THE INVENTION

The invention relates generally to integrated circuits, and more particularly, to the transmission of binary information words between two components incorporated within one and the same system.

BACKGROUND OF THE INVENTION

It is known to provide for the transmission of binary information words between two components incorporated within one and the same system, for example between two integrated circuits for chips, made on the printed card of a portable telephone. These two integrated circuits may be processors each dedicated to a particular application. The various integrated circuits (two or more) are connected via transmission buses on which switches are arranged.

The function of these switches is to distribute the data dispatched by a first group of integrated circuits (senders) to a second group of integrated circuits (receivers). More precisely, the switches comprise a series of inputs linked to the senders and a series of outputs linked to the receivers. Stated otherwise, the inputs of the switch play the role of receivers in relation to the sender integrated circuits, and the outputs of the switch play the role of senders in relation to the receiver integrated circuits.

A technique conventionally used for transferring data is that of credit control. In a simplified manner, the receivers dispatch a certain number of credits to the senders (corresponding to a certain quantity of data) that they are authorized to transmit to them. On receiving these credits, the senders can transmit data to the receivers until the credits received are used up.

In addition to the transferring of the data by credit control, it may be necessary to take account of the nature of the data conveyed. Specifically, each input of the switch receives from the sender to which it is connected, various types of data (audio, video, etc.), which are distributed by the switch to the appropriate outputs. For example, all the audio data received at input are transmitted to the first output which transfers them to the corresponding receiver, able to process data of audio type.

SUMMARY OF THE INVENTION

According to embodiments of the invention, a method and a device are provided for transferring data and making it possible to transfer data from a first set of elements to a second set of elements in an advantageous manner, without data loss and without data congestion.

According to a first aspect, there is provided a method of transferring data between a first and a second set of elements via a switching circuit or means comprising a set of paths each associated with a weighting coefficient representing a data stream for each path. The method may comprise a credit flow control between the first set of elements and the switching means and a credit flow control between the switching means and the second set of elements.

According to a general characteristic of this method, an available credit coefficient is computed for each element of the first set on the basis of a credit allocated by each element of the second set and of the weighting coefficient of each path. The transfer of the data is then performed on the basis of each available credit coefficient.

In particular, to do this, a credit value is moreover calculated for each element of the first set, indicating the quantity of data that the switching means are authorized to receive from the first element, the credit value being calculated on the basis of the credit coefficient computed and of a value representative of a quantity of memory space available in the switching means to receive data originating from each element of the first set of elements. Stated otherwise, each pathway that the data can take during the data transfer (for example with the aid of switch) is characterized by a weighting coefficient. This coefficient represents for example the probability that data dispatched on a certain input are dispatched to a certain output.

It is as a function of this weighting coefficient, as well as of the credit allocated by the elements of the second set, that the credit value is calculated. This aspect has the advantage, e.g. due to optimal distribution, of being able to transfer the data between the elements of the first set and of the second set, at strained flow.

According to a mode of implementation, the credit value may be calculated by calculating the minimum value between the credit coefficient and the value representative of the available memory space. For example, the credit value calculated is transmitted to each element of the first set, the transfer of the data between each element of the first set and the switching means being performed as a function of the credit value calculated. Furthermore, the data may be transmitted in the paths of the switching means as a function of the nature of the data.

According to another aspect, a device is provided for transferring data between a first and a second set of elements comprising a switch or means comprising a set of paths each associated with a weighting coefficient representing a data stream for each path and comprising inputs and outputs, respectively associated with elements of the first and of the second set. The switch may comprise a calculating component or means for calculating an available credit coefficient for each element of the first set on the basis of a credit allocated by each element of the second set and of the weighting coefficient of each path and for transmitting the data on the basis of the value of the credit coefficient calculated.

The switch may further comprise a calculating component or means for calculating a credit value for each element of the first set, indicating the quantity of data that the switch are authorized to receive from the first element. The credit value may be calculated on the basis of the credit coefficient computed and of a value representative of a quantity of memory space available in the switch to receive data originating from each element of the first set of elements.

According to another characteristic of this device, the switch may further comprise a calculation component able to calculate the credit value on the basis of the minimum value between the credit coefficient and the value representative of the available memory space. The credit coefficient for an input numbered i, i being an integer, may be equal to:

$$OP_i(t) = \sum_{j=1}^{n} \gamma_{ij} \Delta_j(t),$$

with $\gamma_{ij}(t) = 1/\alpha_{ij}(t)$ if $\alpha_{ij}(t) \neq 0$ or $\gamma_{ij}(t) = 0$, $\alpha_{ij}(t)$ being the punctuation coefficient for the input/output pair respectively numbered i and i, j being an integer lying between 1 and n, and where:

n is the number of outputs of the distribution means, and $\Delta_j(t)$ is the quantity of data that it is possible to transfer from the output numbered j.

According to another aspect, there is further proposed a telecommunication system, for example a portable telephone, incorporating a device as defined above.

BRIEF DESCRIPTION OF THE DRAWINGS

Other advantages and characteristics will become apparent on examining the detailed description of wholly nonlimiting modes of implementation and embodiments, and the appended drawings in which.

DETAILED DESCRIPTION OF THE PREFERRED EMBODIMENTS

Figure 1:
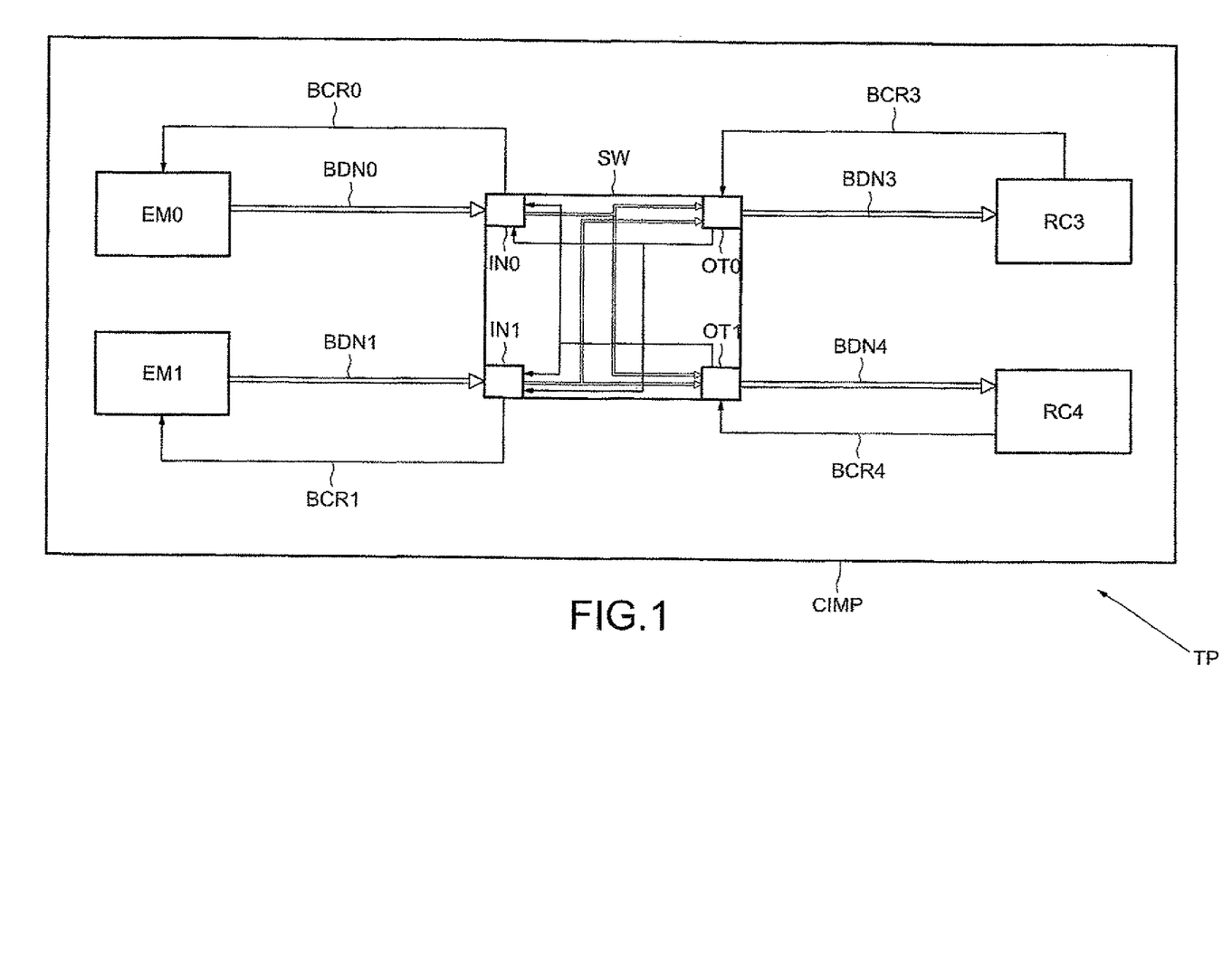
FIG. 1 is a schematic block diagram representing an embodiment of a device for transferring data between a first and a second set of elements in accordance with features of the present invention.

In FIG. 1, the reference TP denotes a communication system, for example a portable telephone. The system TP includes a printed circuit CIMP. On this printed circuit CIMP are for example arranged two integrated circuits playing the role of senders EM0 and EM1. The integrated circuits may be processors each related to a given application.

The printed circuit CIMP also comprises two other integrated circuits RC3 and RC4 playing the role of receivers. In this example, the circuits EM0 and EM1 send data to the circuits RC3 and RC4. However, the roles of the integrated circuits could be exchanged. Furthermore, the printed circuit could comprise more or fewer integrated circuits. The example illustrated in FIG. 1 is not in any way limiting.

The senders EM0 and the receivers RC3 and RC4 are coupled with the aid of the data transfer links BDN0, BDN1, BDN3 and BDN4. These data transfer links are connected via a switch SW. The switch SW here comprises two inputs IN0 and IN1 respectively associated with the senders EM0 and EM1. More precisely, the receiver EM0 is linked to the input IN0 via the data transfer link BDN0 and the sender EM1 is linked to the input IN1 via the data transfer link BDN1. The switch SW also comprises two outputs OT0 and OT1 respectively coupled to the receivers RC3 and RC4 via the data transfer links BDN3 and BDN4.

Each input and each output is associated with a memory space (for example of FIFO type, "First In First Out"). This memory space is not represented in FIG. 1 for the sake of simplification. For the inputs, the associated memory space makes it possible to store the data dispatched by the senders to which they are respectively coupled. For the outputs, this memory space makes it possible to store the data to be dispatched to the receivers to which they are respectively coupled. This memory space may be a portion of a global memory associated with the switch or with the portable telephone TP.

The senders EM0 and EM1 send data to the inputs of the switch IN0 and IN1 via the data transfer links BDN0 and BDN1. The switch SW distributes the data as a function of their category, to one or the other of its outputs OT0 and OT1 so as to transfer them to the appropriate receivers RC3 or RC4.

As mentioned previously, the transmission of data between senders and receivers may be performed according to the credit control technique. To authorize the circuits EM0 and EM1 to transfer data to them, the inputs IN0 and IN1 dispatch a certain number of credits to them (stated otherwise a quantity of data that the circuits EM0 and EM1 are authorized to dispatch to them) via the buses BCR0 and BCR1. Likewise, the receivers RC3 and RC4 dispatch a certain number of credits via the data transfer links BCR3 and BCR4 to the outputs OT0 and OT1 of the switch SW.

The switch is furnished with all the hardware and/or software to allow it, as will be detailed hereinbelow, to compute the credit values intended for the sender circuits on the basis of an available credit coefficient calculated on the basis of the credit allocated by each receiver to the switch and of a weighting coefficient assigned to each path of the switch. The principle of transferring data via the credit control technique will be recalled in greater detail hereinbelow.

Figure 2:
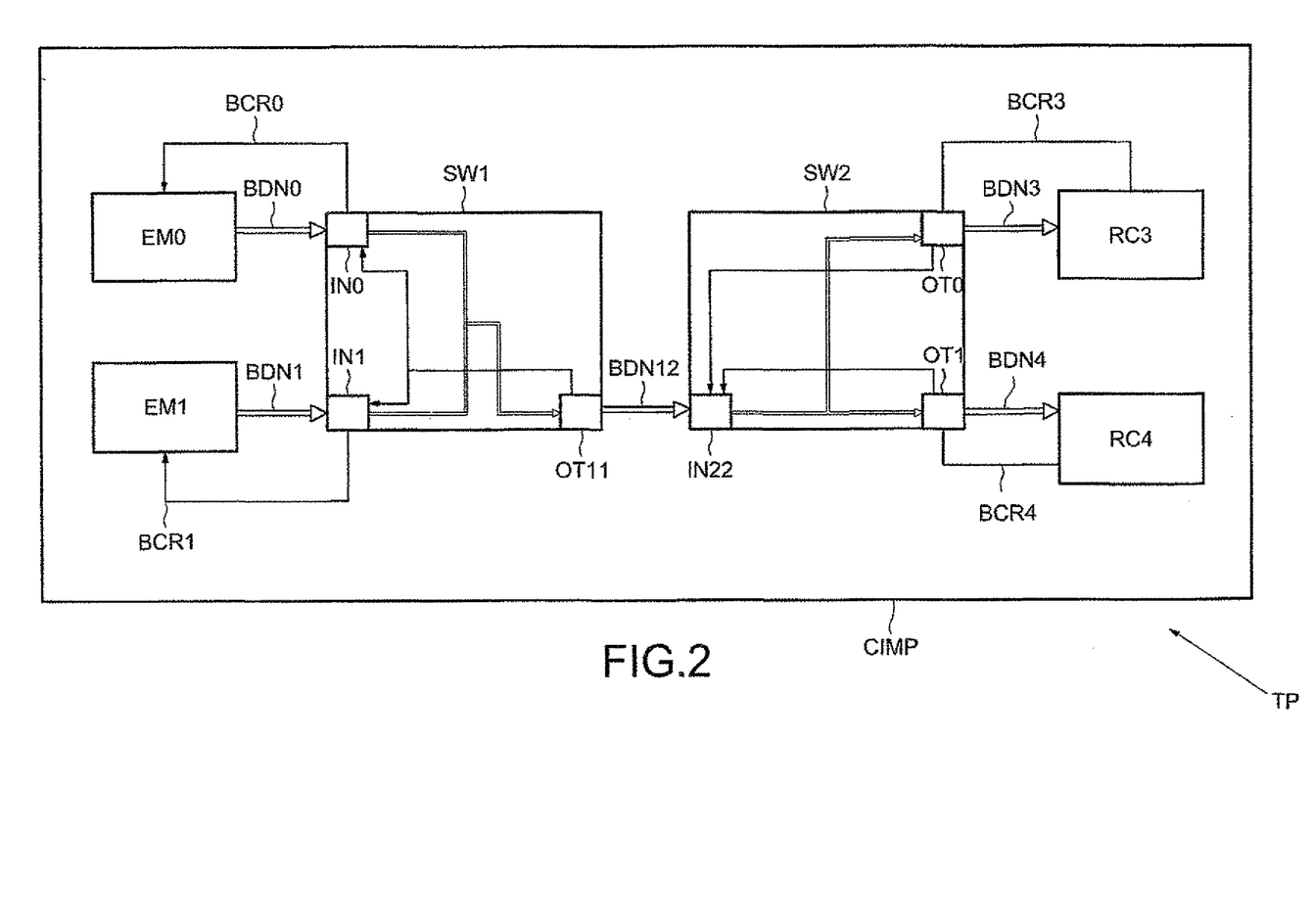
FIG. 2 is a schematic block diagram representing another embodiment of a device for transferring data between a first and a second element in accordance with features of the present invention.

Reference is now made to FIG. 2 which illustrates another embodiment of a data transfer device. In this embodiment, the sender integrated circuits on the one hand EM0, EM1 and receiver integrated circuits on the other hand RC3, RC4 are coupled via a first and a second switch, respectively SW1 and SW2. The latter are linked with the aid of a data transfer link BDN12 which couples an output OT1 of the first switch SW1 to an input IN22 of the second switch SW2. The first switch SW1 could comprise another output so as to couple the circuits EM0 and EM1 to other receiver circuits. However, for the sake of simplification, these other receiver circuits are not represented on the printed circuit CIMP. As in the embodiment envisaged in FIG. 1, links BCR0, BCR1, BCR2 and BCR3 are moreover provided for implementing the transfer of data by credit control.

Reference is now made to FIGS. 3A to 3E which illustrate the data transfer technique according to the aforesaid credit control technique. Represented in FIG. 3A by way of example are a sender integrated circuit EM and a receiver integrated circuit RC. The time is the instant $t_0$. The sender integrated circuit EM comprises a storage unit or means MMEM able in this example to store two variables R and U respectively. The variable R represents the credits that have been allocated by the receiver RC to the sender EM. Stated otherwise, the sender circuit EM is authorized to transmit a quantity of data corresponding to R credits to the receiver RC. For example, each credit may be equivalent to 32 data bytes.

Figure 3A:
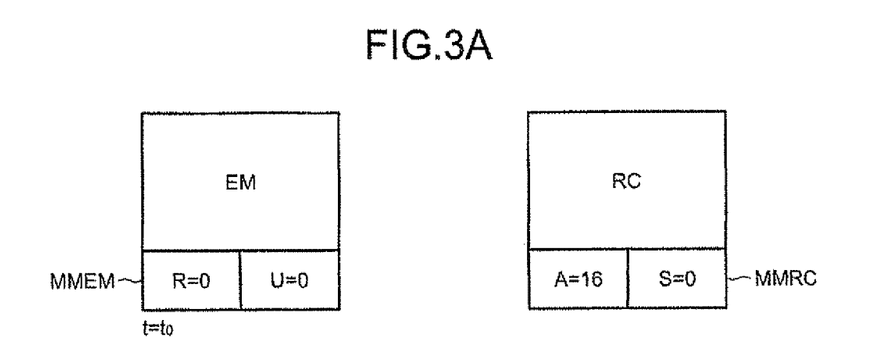
FIGS. 3A to 3E are schematic diagrams representing a data control technique based on the credit control technique in accordance with features of the present invention.

At the instant $t_0$, the variable R is equal to zero, the sender integrated circuit EM then not yet being authorized to transmit data. The variable U represents the number of credits used by the sender integrated circuit EM. Stated otherwise, the variable U illustrates the quantity of data already dispatched by the sender circuit EM to the receiver circuit RC, in view of the quantity of data that it was authorized to transmit. Consequently, the value of the variable U is always less than or equal to the value of the variable R.

The receiver integrated circuit RC likewise comprises a storage unit or means MMRC capable of storing two variables A and S. The variable A is likewise a credit value. It corresponds to the quantity of data that the receiver circuit RC can store in the memory space to which it is coupled as specified hereinabove. The variable S corresponds to the number of credits that the receiver has dispatched to the sender, that is to say the number of credits that the receiver RC authorizes the sender EM to dispatch to it. The value of the variable S is always less than the value of the variable A. And indeed the value of the variable S may be less than the value of the variable A minus a threshold. The latter may for example be equal to two bytes. For the sake of simplification, this threshold will be considered to be zero for FIGS. 3A to 3E.

Figure 3B:
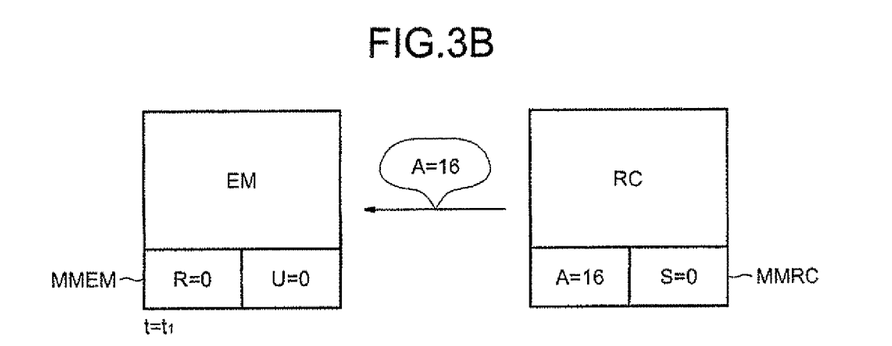
Figure 3C:
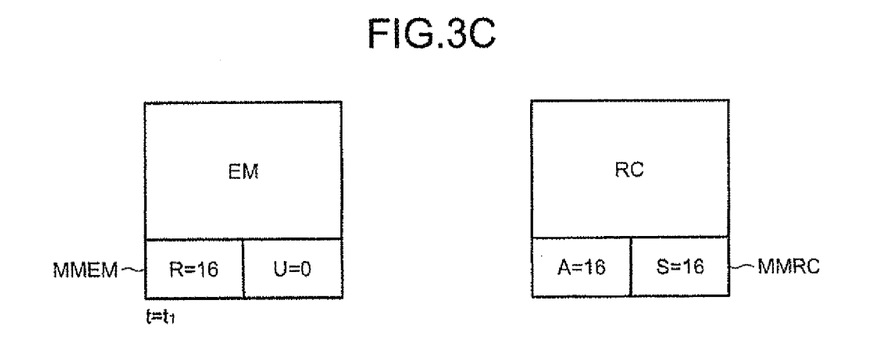

Reference is now made to FIG. 3B. The time is the instant $t_1$. At this instant, the receiver RC allocates sixteen credits to the sender EM. Consequently, as illustrated in FIG. 3C, the variable R of the sender EM passes to the value of sixteen credits, this signifying that the sender EM is authorized to dispatch a number of bytes corresponding to sixteen credits (512 bytes in the case where a credit corresponds to 32 bytes). Likewise at the instant $t_1$, the variable S of the receiver RC passes to 16 given that the latter has authorized the receiver RC to dispatch 16 credits.

Figure 3D:
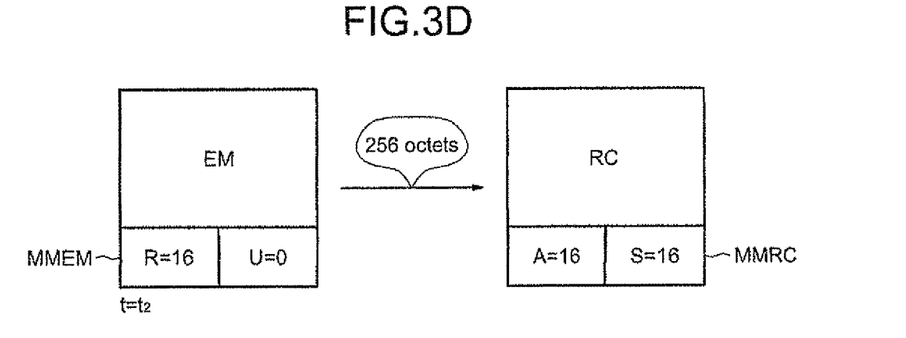
Figure 3E:
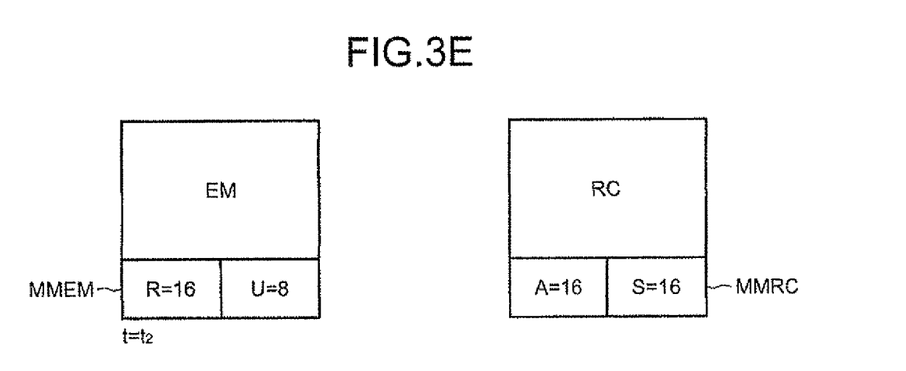

At the instant $t_2$, represented in FIG. 3D, the sender EM dispatched 256 bytes (corresponding to 8 credits) to the receiver RC. Consequently, as may be seen in FIG. 3E, the variable U of the sender EM takes the value 8. The sender EM may therefore still be authorized to dispatch 256 data bytes corresponding to 8 credits.

Figure 4:
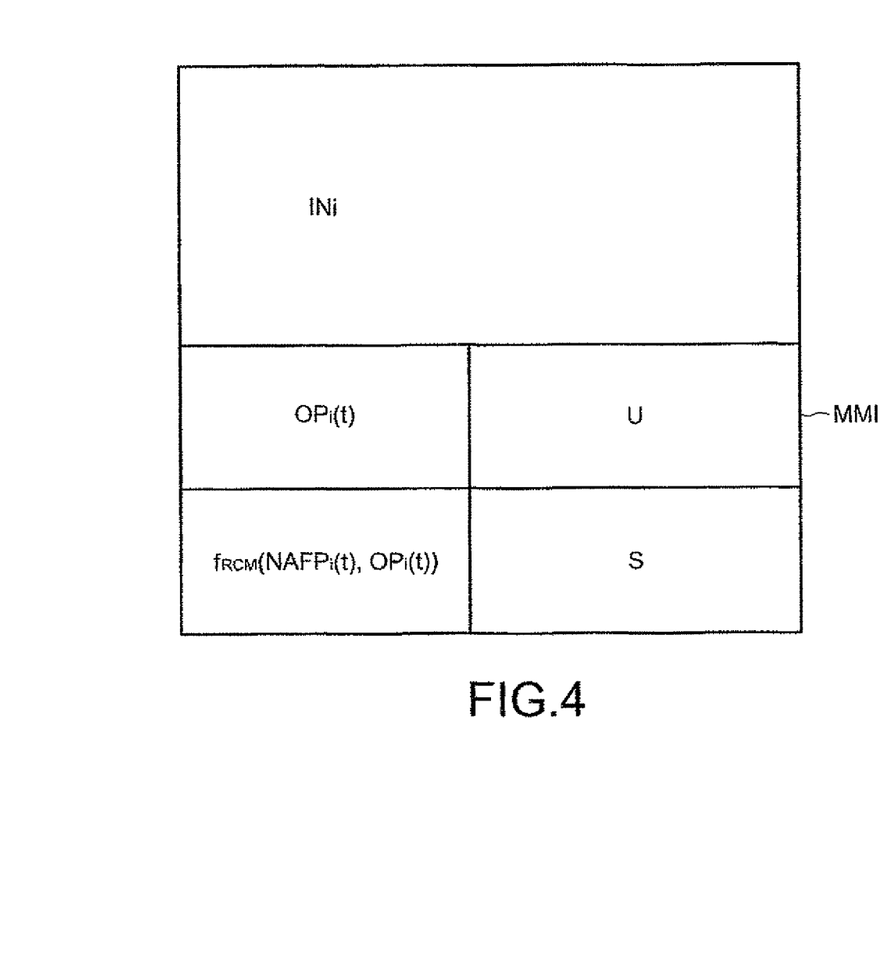
FIGS. 4 and 5 are schematic block diagrams representing storage units associated respectively with the inputs and with the outputs of a distribution unit.

Reference is now made to FIG. 4, which illustrates an input port INi of a switch SW as represented for example in FIG. 1. The index i is an integer corresponding to the serial number of the input port of the switch. As specified hereinabove, each input port INi plays the role of receiver from the point of view of the sender integrated circuit EMI to which it is coupled.

The input port INi comprises a storage unit or means MMI. In this example, the storage unit MMI is capable of storing several variables, including a variable S, previously described, which corresponds to the number of credits that the input port has dispatched to the sender integrated circuit to which it is coupled, as described previously with reference to FIGS. 3A and 3E, and including the variable U (not used in this example) which corresponds to the credit used if the input port was used as output port to the associated sender, and a variable R (not used here) which is used to store the number of credits used if, likewise, the input port was used as output port to the associated sender.

Additionally, the switch SW comprises a calculation component for calculating a credit coefficient $OP_i(t)$, on the basis of the credits allocated by each receiver RC3, RC4 to the switch SW and of the weighting coefficient of each path that might be used within this switch. This credit coefficient is also stored in the storage unit MMI The switch SW furthermore comprises calculation component able to calculate a credit value A on the basis of the credit coefficient $OP_i(i)$ calculated and of the quantity of memory available in the switch, as will be described in detail hereinbelow. This credit value is also stored in the storage unit MMI. It will however be noted that the credit value A, which is dependent on the variable $OP_i(t)$ and on the quantity of memory available in the memory space coupled to the input port INI, is calculated with respect to or modulo a threshold.

Specifically, it is preferable to leave a minimum quantity of memory available at the level of the memory coupled to the input port INi so as to avoid any risk of data congestion. The function making it possible to generate the second variable is called $f_{RCM}$. Stated otherwise the second variable corresponds to: $f_{RCM}(NAFP_i(t), OP_i(t))$. It corresponds for example to the minimum between the two variables $NAFP_i(t)$ and $OP_i(t)$.

Figure 5:
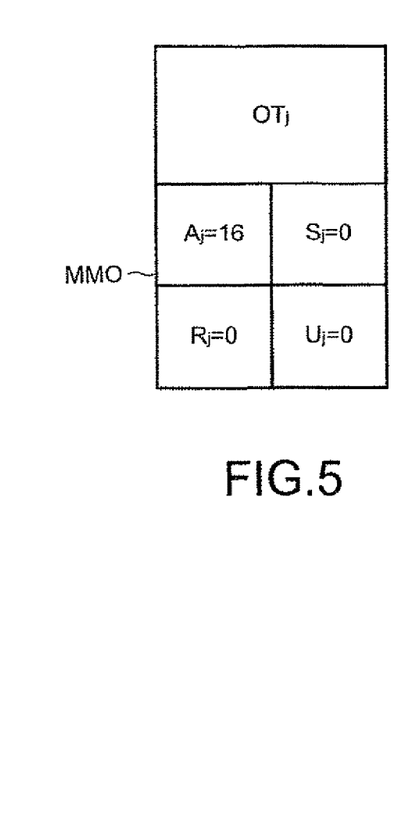

Reference is now made to FIG. 5, which illustrates an output port $OT_j$, j being the serial number of the output port with respect to its rank in the switch. The output port $OT_j$ comprises a storage unit or means MMO. In this example, these storage unit MMO is capable of storing four different variables: $A_j$, $S_j$, $R_j$ and $U_j$.

The particular manner in which the variable $OP_i(t)$ is computed will now be described. To do this, reference is made to FIG. 6 which illustrates the data streams within a switch SW. The input port IN0 receives as input data originating from a sender integrated circuit to which it is coupled. In this example, it receives two types of data D1 (white arrow) and D2 (grey arrow). For example, the data D1 may be of audio type, and the data D2 of video type. Likewise, the input terminal IN1 receives two types of data D1 and D2 from the sender integrated circuit to which it is coupled. These data are dispatched respectively from the input ports IN0 and IN1 to the output ports: OT0 for the data D1, and OT1 for the data D2.

Figure 6:
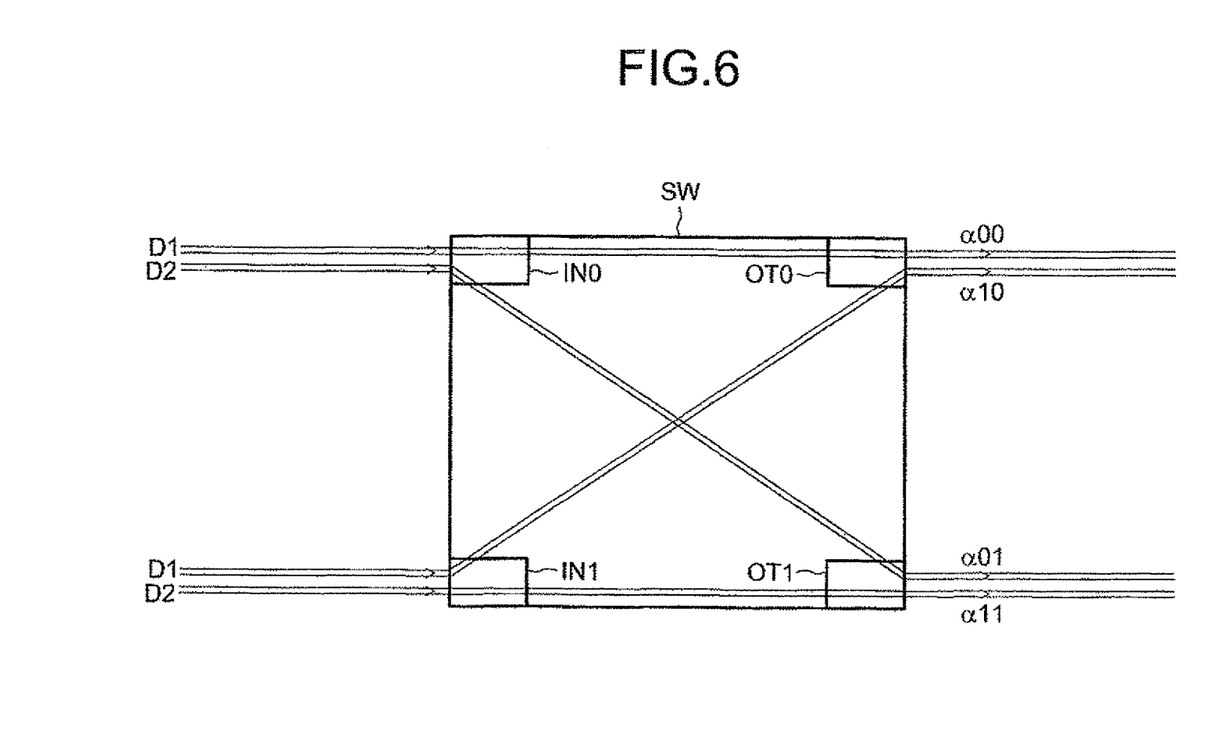
FIG. 6 is a schematic diagram illustrating an embodiment of a distribution unit as well as the various possible pathways and the flow coefficients associated therewith.

It is possible to enumerate four different pathways according to the input/output pairs taken by the incoming and outgoing data. The first pathway is delimited by the ports IN0/OT0, the second pathway by the ports IN0/OT1, the third pathway by the ports IN1/OT0 and the fourth pathway by the ports IN1/OT1. The data streams via these four pathways are characterized by a weighting coefficient, respectively, $\alpha 00(t)$, $\alpha 01(t)$, $\alpha 10(t)$ and $\alpha 11(t)$, which define a weight for each pathway.

The credit coefficient $OP_i(t)$ is then computed according to the following expression:

$$OP_i(t) = \sum_{j=1}^{n} \gamma_{ij} \Delta_j(t),$$

where:

$$\Delta_j(t) = R_j(t) - U_j(t)$$

In the above equations, the index i is an integer with the rank of the input port considered within the switch; —the index j is an integer which corresponds to the rank of the output port considered within the switch; —the parameters $R_j$ and $U_j$ are the variables stored by the storage means of the output port of rank j; —the parameter t represents time; —the parameter $\gamma_{ij}(t)$ is equal to $1/\alpha_{ij}(t)$ if $\alpha_{ij}(t) \neq 0$, otherwise $\gamma_{ij}(t)$ is zero, $\alpha_{ij}(t)$ being the weighting coefficient corresponding to the pathway delimited by the input terminal INi and the output port OTj.

For example, if the data streams in FIG. 6 are considered, the following is obtained for the input port IN0:

$$OP_0(t) = \frac{R_0(t) - U_0(t)}{\alpha_{00}(t)} + \frac{R_1(t) - U_1(t)}{\alpha_{01}(t)}$$

and for the input terminal IN1:

$$OP_1(t) = \frac{R_0(t) - U_0(t)}{\alpha_{10}(t)} + \frac{R_1(A) - U_1(t)}{\alpha_{11}(t)}$$

On the basis of the credit coefficients $OP_0(t)$ and $OP_1(t)$ calculated for the input ports IN10 and IN11 respectively the switch, or as the case may be, the switches, calculate a credit value for the sender circuits EM0 and EM1. This calculation is performed on the basis of these credit coefficients, and of the value $NAFP_i$ representative of the memory space available in the switch SW. Thus, the credit value A is given by the following relation:

$$A = f_{REN}(OP_i(t); NAFP_i(E))$$

For example, as indicated previously, to calculate the credit value, the minimum value between the values OP and $NAFP_i$ is chosen.

Figure 7:
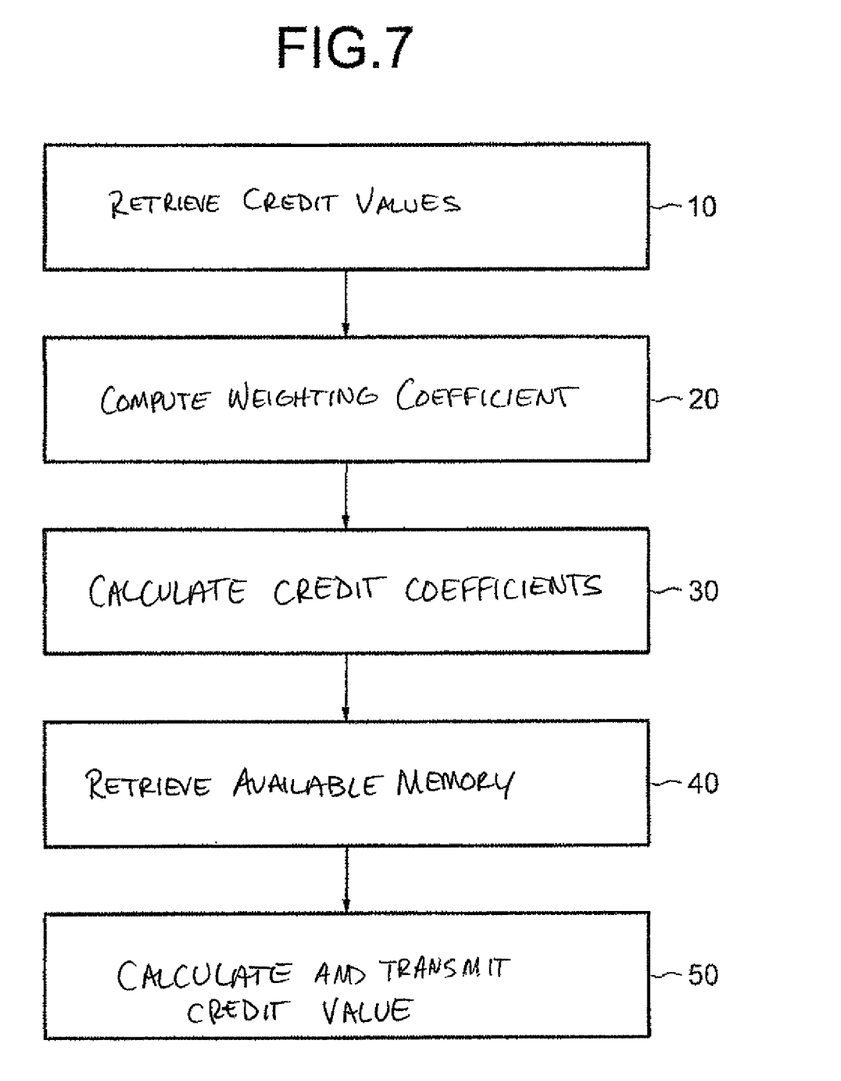
FIG. 7 is a flowchart illustrating a mode of implementing a method of transferring data between a first and a second set of elements in accordance with features of the present invention.

Reference is now made to FIG. 7 which illustrates the procedure for transferring data between a sender circuit and a receiver circuit, by way of a switch, or of several switches as described previously. In the course of a first step 10, the switch retrieves credit values originating from the receiver circuits RC3, RC4. Successively, or simultaneously, a weighting coefficient $\alpha_{ij}$ is computed for each pathway that might be taken in the switch (step 20).

On the basis of these values, as indicated previously, the switch calculates the credit coefficients $OP_0(t)$ and $OP_1(t)$ for each input port IN0 and IN1 (step 30). During the next step 40, the switch retrieves the quantity of memory available in the switch. It then calculates the credit value A, as described previously. The credit value can then be transmitted to the sender circuit so as to implement the data transfer by credit control using the credit value thus calculated (step 50).

It is then possible to carry out the transfer of the data of the first data set to the switch, then to the receivers using, on the one hand, the credit coefficient calculated by the switch SW and transmitted to the sender circuit and, on the other hand, the credit allocated via the receiver circuits to the switch SW.

That which is claimed is:

1. A method of transferring data between a first and a second set of integrated circuits via a switch circuit including a set of paths each associated with a weighting coefficient representing a data stream for each path, the switch circuit also including inputs and outputs respectively associated with integrated circuits of the first and second sets, the method comprising:
   credit flow controlling, by the switch circuit, between the first set of integrated circuits and the switch circuit and credit flow controlling between the switch circuit and the second set of integrated circuits, wherein credit flow controlling includes:
      computing, via the switch circuit, an available credit coefficient for each integrated circuit of the first set on the basis of a credit allocated by each integrated circuit of the second set and of the weighting coefficient of each path; and
      transmitting, by the switch circuit, the data based upon the computed available credit coefficient.

2. The method according to claim 1, wherein a credit value is calculated, via the switch circuit, for each integrated circuit of the first set indicating the quantity of data that the switch circuit is authorized to receive from the first integrated circuit, the credit value being calculated on the basis of the credit coefficient computed and of a value representative of an amount of memory space available in the switch circuit to receive data originating from each integrated circuit of the first set of integrated circuits.

3. The method according to claim 2, wherein the credit value is calculated by calculating a minimum value between the credit coefficient and the value representative of the available memory space.

4. The method according to claim 2, wherein the credit value calculated is transmitted to each integrated circuit of the first set, and the transfer of the data between each integrated circuit of the first set and the switch circuit is performed as a function of the credit value calculated.

5. The method according to claim 1, wherein the data are transmitted in the paths of the switch circuit as a function of a type of the data.

6. A device for transferring data between a first and a second set of integrated circuits, the device comprising:
   a switch circuit including a set of paths each associated with a weighting coefficient representing a data stream for each path and comprising inputs and outputs respectively associated with integrated circuits of the first and of the second set;
   the switch circuit configured to calculate an available credit coefficient for each integrated circuit of the first set on the basis of a credit allocated by each integrated circuit of the second set and of the weighting coefficient of each path and to transmit the data on the basis of the value of the credit coefficient calculated.

7. The device according to claim 6, wherein the switch circuit calculates a credit value for each integrated circuit of the first set, indicating the quantity of data that the switch circuit is authorized to receive from the first integrated circuit, the credit value being calculated on the basis of the credit coefficient computed and of a value representative of an amount of memory space available in the switch circuit to receive data originating from each integrated circuit of the first set of integrated circuits.

8. The device according to claim 7, wherein the switch circuit calculates the credit value on the basis of a minimum value between the credit coefficient and the value representative of the available memory space.

9. The device according to claim 8, wherein the available credit coefficient for an input numbered i, i being an integer, is equal to:

$$OP_i(t) = \sum_{j=1}^{n} \gamma_{ij} \Delta_j(t),$$

with $\gamma_{ij}(t) = 1/\alpha_{ij}(t)$ if $\alpha_{ij}(t) \neq 0$ or $\gamma_{ij}(t) = 0$, $\alpha_{ij}(t)$ being the flow coefficient for the input/output pair respectively numbered i and j, j being an integer between 1 and n, and where $OP_i(t)$ is the distribution parameter for the input numbered i, n is the number of outputs of distribution, and $\Delta_j(t)$ is the quantity of data that it is possible to transfer from the output numbered j.

10. A telecommunication system comprising:
   a printed circuit including a first and a second set of integrated circuits; and a device for transferring data between the first and second set of integrated circuits, the device comprising:

a switch including a set of paths each associated with a weighting coefficient representing a data stream for each path and comprising inputs and outputs respectively associated with integrated circuits of the first and of the second set, and the switch configured to calculate an available credit coefficient for each integrated circuit of the first set on the basis of a credit allocated by each integrated circuit of the second set and of the weighting coefficient of each path and to transmit the data on the basis of the value of the credit coefficient calculated.

11. The telecommunication system according to claim 10, wherein the switch calculates a credit value for each integrated circuit of the first set, indicating the quantity of data that the switch is authorized to receive from the first integrated circuit, the credit value being calculated on the basis of the credit coefficient computed and of a value representative of an amount of memory space available in the switch to receive data originating from each integrated circuit of the first set of integrated circuits.

12. The telecommunication system according to claim 11, wherein the switch calculates the credit value on the basis of a minimum value between the credit coefficient and the value representative of the available memory space.

13. The telecommunication system according to claim 12, wherein the available credit coefficient for an input numbered i, i being an integer, is equal to:

$$OP_i(t) = \sum_{j=1}^{n} \gamma_{ij} \Delta_j(t),$$

with $\gamma_{ij}(t)=1/\alpha_{ij}(t)$ if $\alpha_{ij}(t) \neq 0$ or $\gamma_{ij}(t)=0$, $\alpha_{ij}(t)$ being the flow coefficient for the input/output pair respectively numbered i and j, j being an integer between 1 and n, and where $OP_i(t)$ is the distribution parameter for the input numbered i, n is the number of outputs of distribution, and $\Delta_j(t)$ is the quantity of data that it is possible to transfer from the output numbered j.

14. A method of transferring data between a first and a second set of integrated circuits via a switch circuit including a set of paths, the switch circuit also including inputs and outputs respectively associated with integrated circuits of the first and second sets, the method comprising:

credit flow controlling, by the switch circuit, data transferred between the first set of integrated circuits and the switch circuit and data transferred between the switch circuit and the second set of integrated circuits, wherein credit flow controlling includes:

determining, by the switch circuit, an available credit coefficient for each integrated circuit of the first set based on a credit allocated by each integrated circuit of the second set and a likelihood for each path of the switch circuit that data dispatched on a corresponding input is dispatched to a corresponding output; and transmitting, by the switch circuit, data on the set of paths based on the available credit coefficients so that data congestion between the first set and second set of integrated circuits is reduced.

15. The method according to claim 14, wherein a credit value is calculated, via the switch circuit, for each integrated circuit of the first set indicating a quantity of data that the switch circuit is authorized to receive from each integrated circuit of the first set, the credit value being calculated based on the available credit coefficient and a value representative of an amount of memory space available in the switch circuit to receive data originating from each integrated circuit of the first set.

16. The method according to claim 15, wherein the credit value is calculated by determining a minimum value between the available credit coefficient and the value representative of the available memory space.

17. The method according to claim 15, wherein the credit value calculated is transmitted to each integrated circuit of the first set, and the transfer of the data between each integrated circuit of the first set and the switch circuit is performed as a function of the credit value.

18. The method according to claim 14, wherein the data are transmitted in the paths of the switch circuit as a function of a type of the data.

19. A device for transferring data between a first set and a second set of integrated circuits, the device comprising:

a switch circuit including a set of paths, inputs and outputs, wherein the inputs and the outputs are respectively associated with the first set and the second set of integrated circuits, and each path includes a likelihood that data dispatched on a corresponding input is dispatched to a corresponding output, the switch circuit configured to:

determine an available credit coefficient for each integrated circuit of the first set based on a credit allocated by each integrated circuit of the second set and the likelihood of each path; and transmit the data based on the available credit coefficients so that data congestion between the first set and second set of integrated circuits is reduced.

20. The device according to claim 19, wherein the switch circuit is further configured to:

calculate a credit value for each integrated circuit of the first set, indicating a quantity of data that the switch circuit is authorized to receive from each integrated circuit of the first set, the credit value being calculated based on the available credit coefficient and a value representative of an amount of memory space available in the switch circuit to receive data originating from each integrated circuit of the first set.

21. The device according to claim 20, wherein the switch circuit is further configured to:

calculate the credit value based on a minimum value between the available credit coefficient and the value representative of the available memory space.

22. The device according to claim 21, wherein the available credit coefficient for an input numbered i, i being an integer, is equal to:

$$OP_i(t) = \sum_{j=1}^{n} \gamma_{ij} \Delta_j(t),$$

with $\gamma_{ij}(t)=1/\alpha_{ij}(t)$ if $\alpha_{ij}(t) \neq 0$ or $\gamma_{ij}(t)=0$, $\alpha_{ij}(t)$ being the flow coefficient for the input/output pair respectively numbered i and j, j being an integer between 1 and n, and where
- $OP_i(t)$ is the distribution parameter for the input numbered i,
- n is the number of outputs of distribution, and
- $\Delta_j(t)$ is the quantity of data that it is possible to transfer from the output numbered j.

* * * * *